United States Patent [19]
Roosa

[11] Patent Number: 5,199,792
[45] Date of Patent: Apr. 6, 1993

[54] SANDWICH POUCH
[75] Inventor: Paul D. Roosa, Saugerties, N.Y.
[73] Assignee: International Paper Company, Purchase, N.Y.
[21] Appl. No.: 779,468
[22] Filed: Oct. 18, 1991
[51] Int. Cl.$^5$ .................... B65D 30/20; B65D 33/24; B65D 27/34
[52] U.S. Cl. .................. 383/4; 229/DIG. 13; 383/1; 383/87; 383/207
[58] Field of Search .................... 383/87, 4, 207, 1; 229/87.05, DIG. 13, 92.1, 92.3, 92.5, 92.7, 68 R

[56] References Cited
U.S. PATENT DOCUMENTS

| | | | |
|---|---|---|---|
| 211,725 | 1/1879 | Foster | 229/81 |
| 245,368 | 8/1881 | Gans | 229/92.7 |
| 526,799 | 10/1894 | Barnard | 383/87 |
| 638,561 | 12/1899 | Cook | 229/92.7 |
| 753,333 | 3/1904 | Vanderlip | 383/87 |
| 915,124 | 3/1909 | Sprague | 229/68 R |
| 1,258,062 | 3/1918 | Tannenbaum | 229/81 |
| 1,955,563 | 4/1934 | Rosenfeld | 229/72 |
| 2,574,345 | 11/1951 | Montgomery . | |
| 2,668,769 | 2/1954 | Schlienz . | |
| 2,703,426 | 3/1955 | Barkl . | |
| 2,842,179 | 7/1958 | Hoeppner | 383/87 |
| 3,233,815 | 2/1966 | Eggen . | |
| 3,570,751 | 3/1971 | Trewella . | |
| 3,623,653 | 11/1971 | Work | 229/87.05 |
| 4,575,121 | 3/1986 | Conti | 229/92.3 |
| 4,618,992 | 10/1986 | Grotteria | 229/87.05 |
| 4,648,513 | 3/1987 | Newman . | |
| 4,777,054 | 10/1988 | Greenhouse . | |
| 4,895,742 | 1/1990 | Schaub . | |
| 4,941,756 | 7/1990 | Price . | |

Primary Examiner—Stephen P. Garbe
Attorney, Agent, or Firm—Michael J. Doyle

[57] ABSTRACT

A sandwich pouch is formed from a unitary blank of Kraft paper or other easily biodegradable, flexible sheet material. The blank is of generally rectangular form and includes a plurality of generally rectangular panels, joined side by side and foldably secured together by generally transversely extending fold lines. The ends of a pair of middle panels are each provided with a generally rectangular end seal flap. The blank is also provided with a pair of longitudinally extending tear lines which permit the pouch formed from the blank to be torn open at either or both ends to gain access to its contents. The pouch is opened by bending back an upper front closure panel for insertion of a food product such as a hamburger.

1 Claim, 4 Drawing Sheets

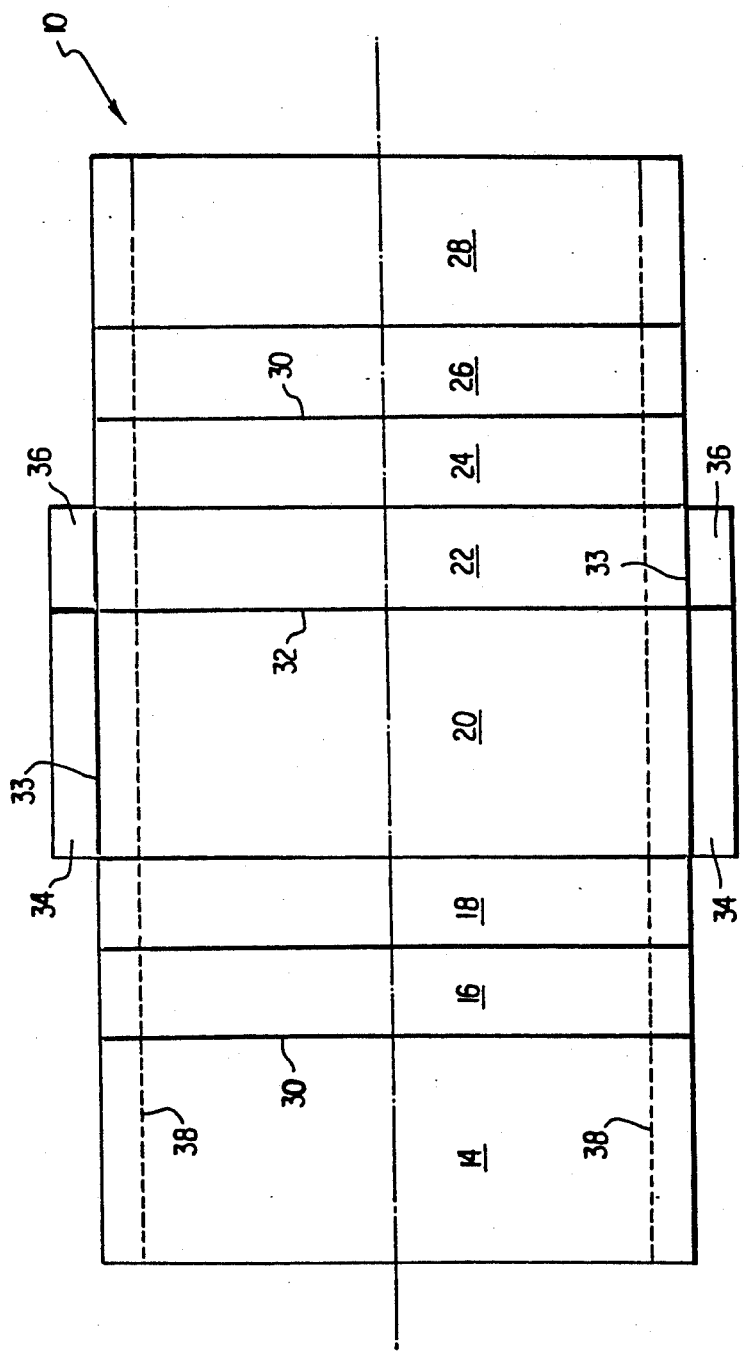
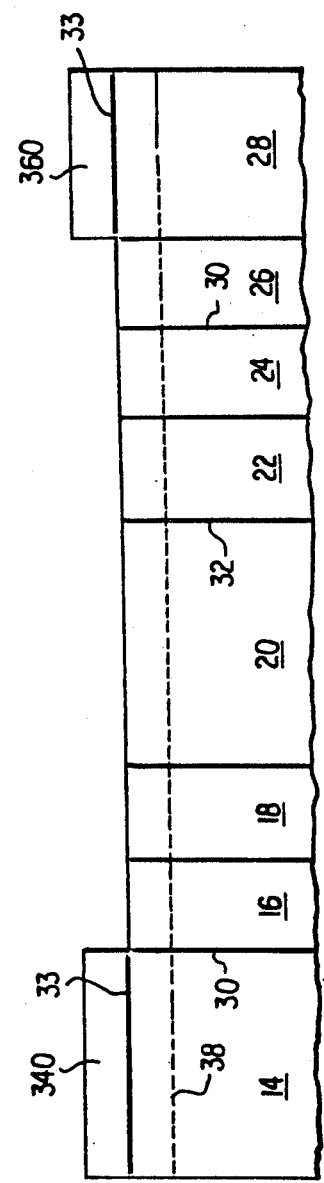
FIG. 1
FIG. 2

FIG. 6
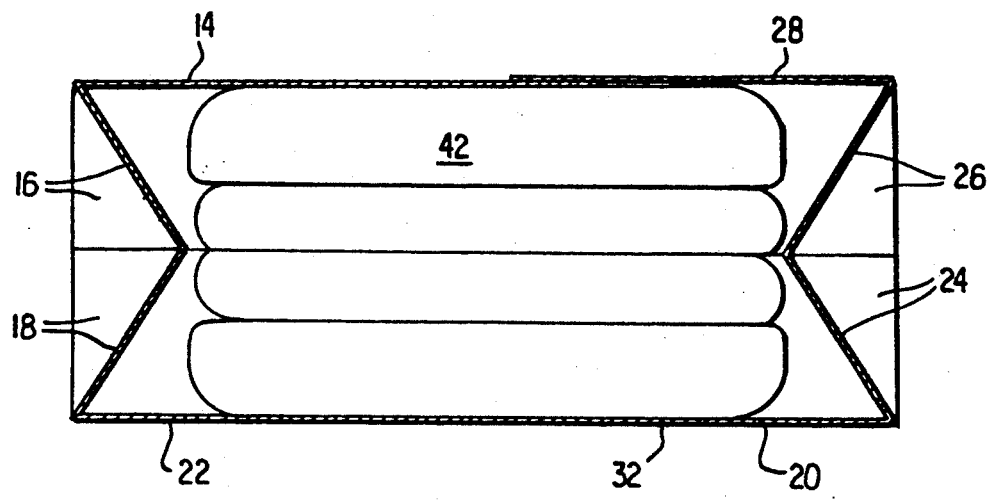
FIG. 7
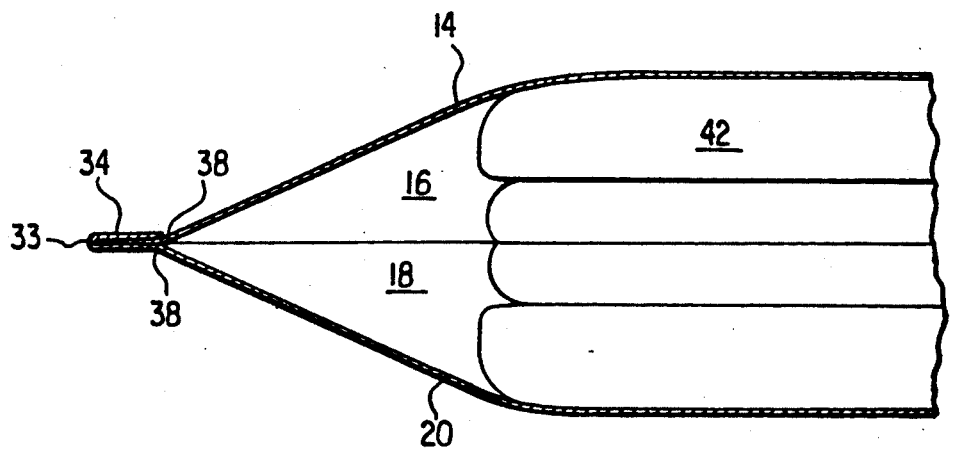
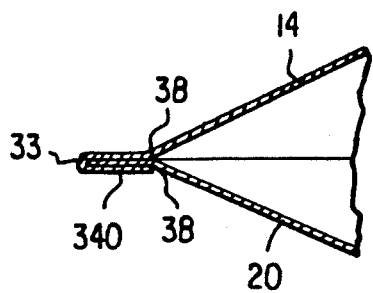
FIG. 7A ically 5,199,792

SANDWICH POUCH

BACKGROUND OF THE INVENTION

This invention relates to a container for food and more particularly to a Kraft paper pouch for enclosing a sandwich, such as a hamburger.

With the advent of increased environmental concerns, many fast food operations are no longer using conventional containers, such as the popular clamshell container fashioned from foamed plastic for holding hamburgers or the like. The commercial tendency away from the use of plastic containers for fast food products requires suitable substitute containers, such as those fashioned from paper, paperboard, or other readily biodegradable materials.

The prior art is aware of flexible pouch constructions, yet no one of these constructions is completely satisfactory, or exhibits the advantages of the present construction.

SUMMARY OF THE INVENTION

According to the practice of this invention, a sandwich pouch is fashioned from a unitary blank of Kraft or other paper, the blank provided with fold and tear lines such that when folded and glued it is easily openable so as to permit the insertion of a hamburger or other food product. After closing of the pouch, as for example after the food product has been dispensed to a consumer in the pouch, the consumer may readily gain access to the contents either by reopening the pouch mouth or by tearing off one or both ends of the pouch. By virtue of the nature of the material of construction, such as Kraft paper, the consumer can use the pouch as a napkin or kind of plate upon which to place the sandwich or other food product while it is being consumed.

BRIEF DESCRIPTION OF THE DRAWINGS

FIG. 1 is a plan view of a unitary blank of Kraft or other paper from which the pouch of this construction is formed.

FIG. 2 is a partial view of a modification of the blank of FIG. 1.

FIG. 6 is a section taken along 6—6 of FIG. 5.

FIG. 7 is a section taken along 7—7 of FIG. 5.

FIG. 7A is a view similar to FIG. 7 and illustrates a pouch formed from the blank of FIG. 2.

DETAILED DESCRIPTION OF THE INVENTION

Figure 3:
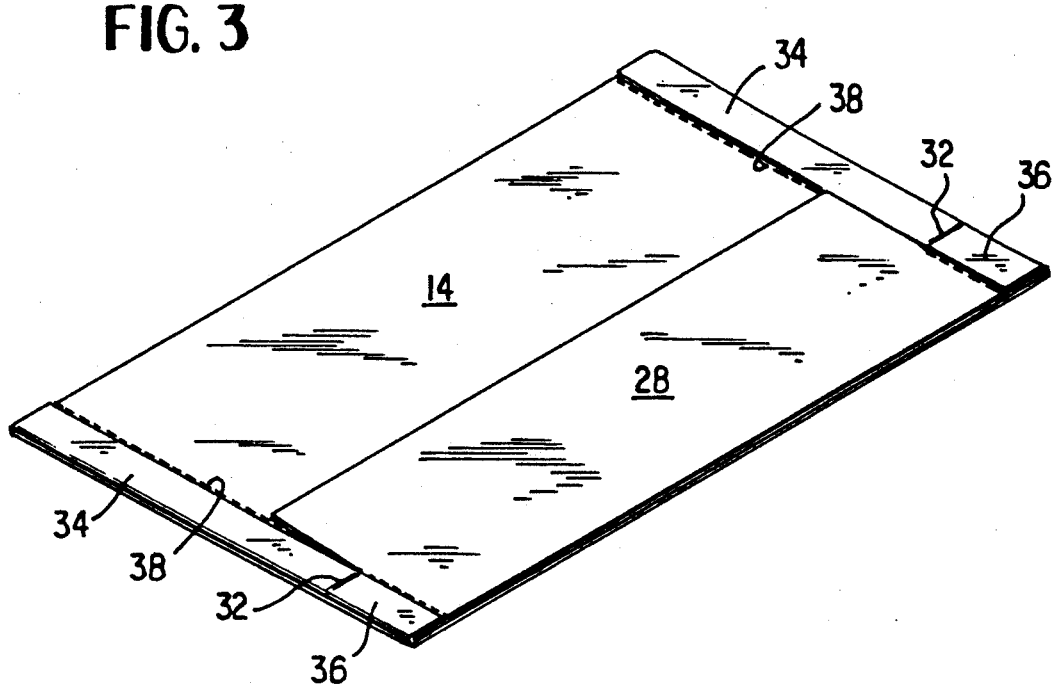
FIG. 3 is a perspective view illustrating the formation of the pouch of this invention from the blank of FIG. 1.

Referring now to FIG. 1 of the drawings, the numeral 10 denotes generally a unitary blank of Kraft, quilted, or other paper from which the pouch of this invention is formed. The blank is generally rectangular and may be considered as having a central longitudinal axis (unnumbered) as illustrated. The blank includes a plurality of generally rectangular panels, being eight in number in the embodiment illustrated, with the panels being designated from left to right as 14, 16, 18, 20, 22, 24, 26, and 28. The panels are separated from each other and defined by a plurality of generally vertical fold lines 30 and longitudinally extending fold lines 33. One of the vertical fold lines is designated as 32 and will later be described in detail. Longitudinally (horizontally) running fold lines 33 are located at the ends of panels 20 and 22 and join integral end seal flaps 34 and 36 to panels 20 and 22 respectively. It will be observed that in this embodiment end seal flaps 34 and 36 are integral with each other, as well as integral with their respective main rectangular panels 20 and 22.

A pair of longitudinally (horizontally) extending tear lines 38 extend the full length of the blank and are near and parallel to the upper and lower edges thereof. Preferably, the distance each tear line 38 is spaced from its respective free longitudinal edge of the blank is substantially the same as the width (vertical extent as shown in FIG. 1) of end seal flaps 34 and 36.

Referring now to FIG. 2 of the drawings, a modification of the blank shown at FIG. 1 is illustrated. Here, the only difference in the blank construction is that end seal flaps 340 are foldably joined to the top and bottom edges of end rectangular panel 14, while the other end seal flaps 360 are foldably joined at the top and bottom edges of the other end rectangular panel 28. These relocated end seal flaps are designated as 340 and 360, respectively. In all other respects, the blank of FIG. 2 is the same as the blank of FIG. 1.

To form the pouch from the blank of FIG. 1, gusset panel pairs 16, 18 and 24, 26 are folded about the respective vertical fold lines between them, and panel 18 folded over on panel 20. Panel 24 is folded over on panel 22. This results in a flattened tube, with panels 20, 22 on the bottom, gusset panels 16, 18 and 22, 24 on top of panels 20, 22, and panels 14, 28 on top. Next, upper end seal flaps 34, 36 are folded about line 33 and glued to the upper end of the flattened tube, thus closing it. The same is done with lower end seal flaps 34, 36 to thereby close the lower end of the flattened tube. The resultant pouch is shown at FIG. 3. It will be seen that the free (right) edge of panel 28 (of FIG. 1) slightly overlaps the free (left) edge of panel 14. The pouch may be considered as having front wall defined by panels 14 and 28, and a rear wall defined by panels 20 and 22. It is seen that internal gussets 16, 18 and 24, 26 run along respective upper and lower longitudinal edges of the pouch, with each end of the pouch being closed by end seal flaps 34, 36 (340, 360). The upper edge of the pouch is considered as the lower, right edge as shown in FIG. 3, while the lower edge of the pouch is considered as the upper left edge as shown in FIG. 3.

Figure 4:
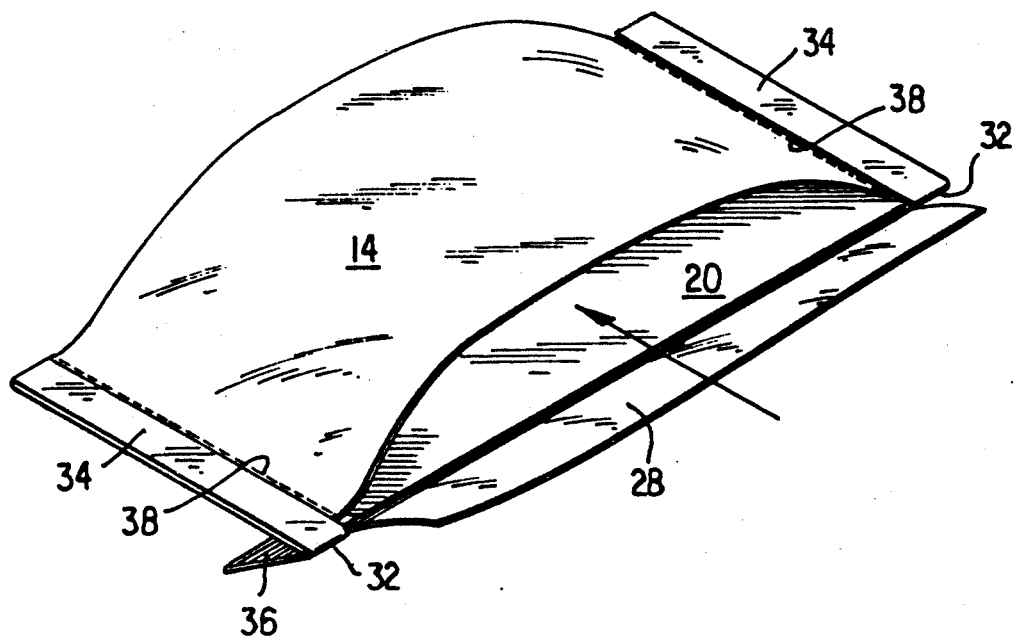
FIG. 4 is a perspective view illustrating the opening of the pouch shown at FIG. 3 to permit the insertion of a hamburger.

The upper portion of the pouch of FIG. 3 is now bent about fold line 32 to open the pouch and thus permit the insertion of a hamburger, as indicated at FIG. 4.

Figure 5:
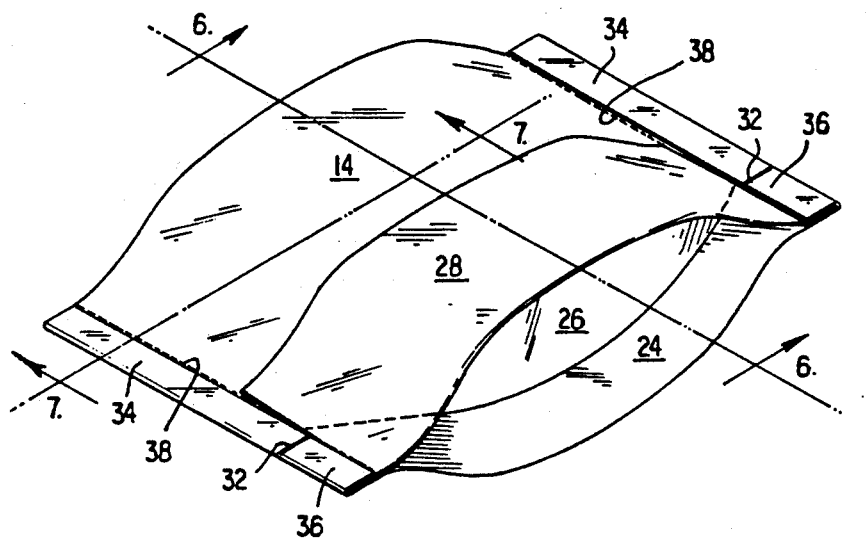
FIG. 5 is a perspective view of the pouch shown at FIG. 4 after a hamburger has been inserted into the pouch and the pouch closed.

Referring now to FIG. 5, a hamburger has been inserted into the pouch, the right hand end of the pouch, termed the upper pouch portion, and which includes panel 28, has been refolded about fold line 32 so as to close the pouch. As shown at FIGS. 6 and 7, the hamburger 42 is fully enclosed and is ready for delivery to a consumer.

Figure 8:
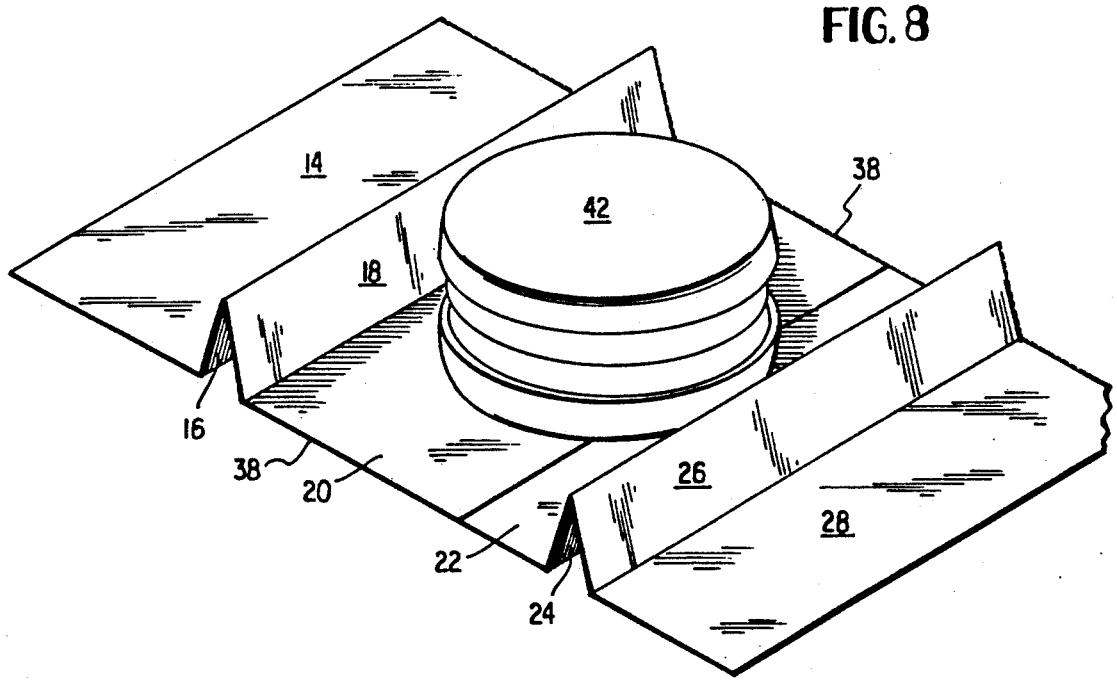
FIG. 8 is a perspective view illustrating the pouch shown at FIG. 5 after the ends of the pouch have been ripped off, and the remaining pouch portions opened to form a napkin.

FIG. 6 also illustrates the lower internal gusset 16, 18 and the upper internal gusset 24, 26. The overlapping of the free edge of top closure flap 28 over the free edge of lower closure flap 14 of the pouch front wall is also shown. Further, longitudinal fold line 32 is seen as positioned below the upper gusset 24, 26 and also above free end of flap 14. When the consumer receives the package, the hamburger can be removed, if desired, be reversing the sequence of steps previously described. Preferably, however, access to the hamburger is obtained by ripping the pouch along both ends along tear lines 38. After such ripping the pouch may be opened, as indicated at FIG. 8, thus exposing the hamburger or other food product. From FIG. 8 it will be observed that the pouch now serves as a kind of plate or napkin upon which the hamburger or other food product may be placed.

Referring now to FIG. 7A of the drawings, a modification is illustrated which will yield substantially the same pouch, but with only a minor variation. The same steps previously described to obtain the pouch of FIG. 3 are carried out, except that with the blank of FIG. 2, flaps 340 and 360 are folded in the opposite direction, so that with respect to FIG. 5, flaps 340 and 360 are on the lower side of the pouch, instead of on the upper side. Otherwise, the action of the formation and the use of the pouch is the same as previously described.

I claim:

1. A sandwich pouch formed of a unitary, generally rectangular blank of paper, said pouch being generally rectangular and having upper and lower edges and having ends, said pouch having rear and front walls, internal upper and lower gussets along respective opposite, upper and lower longitudinal edges of the pouch, said gussets extending into the interior of the pouch, each end of the pouch being closed by end seal flaps, the pouch front wall including a top closure flap extending down from the upper longitudinal gusset and terminating in a free edge, said top closure flap free edge being free of adhesive or any latch, the pouch front wall including a lower flap extending up from the lower longitudinal gusset and terminating in a free edge, the rear pouch wall having a longitudinal fold line, said longitudinal fold lien separating the rear wall into two sections whereby that portion of the pouch rear wall above said rear wall longitudinal fold line can be bent rearwardly to permit insertion of a food product in the pouch, a pair of tear lines, each tear line being spaced from a respective end of the pouch, each said tear line being spaced from its respective pouch end by a distance at least equal to the width of its respective end seal flap, whereby when said end seal flaps are removed by tearing said tear lines the pouch can be opened and will lie flat without cutting or peeling or unlatching the free edge of the top closure flap, and whereby the gussets stand substantially upwardly from the flattened pouch to thereby border an object, such as a sandwich, carried within the pouch prior to tearing.

* * * * *